Jan. 22, 1963 | H. BERMAN ET AL | 3,075,150

TRANSISTOR DEMODULATOR

Filed Oct. 30, 1957

INVENTORS
HERBERT BERMAN
STANLEY SPORN
BY Henry L. Shenier
ATTORNEY

United States Patent Office 3,075,150
Patented Jan. 22, 1963

3,075,150
TRANSISTOR DEMODULATOR

Herbert Berman, Bayside, and Stanley Sporn, Rego Park, N.Y., assignors, by mesne assignments, to United Aircraft Corporation, East Hartford, Conn., a corporation of Delaware Filed Oct. 30, 1957, Ser. No. 693,447
10 Claims. (Cl. 329—50)

Our invention relates to a transistor demodulator and more particularly to a transistor demodulator which is an improvement over demodulators of the prior art.

Demodulators are known in the prior art for deriving intelligence in the form of a varying direct current from a carrier or signal voltage the amplitude of which is proportional to the intelligence. These demodulators of the prior art are relatively inaccurate in that their output voltages contain a relatively large amount of ripple. Many of the demodulators of the prior art do not produce a direct current voltage of the magnitude which is possible with the available carrier voltage. If ripple is to be reduced, expensive filtering networks must be used in the demodulator. If the output direct current voltage is of relatively low energy content, it must be amplified before it reaches a useful magnitude. Some demodulators of the prior art are provided with keying systems for keying the circuit elements to reduce ripple and to improve the linearity of the direct current output voltage. These keyed demodulators of the prior art necessitate the use of external biasing potentials or additional self-biasing resistors and by-pass capacitors to achieve the desirable keyed operation. In addition, in some of these keyed systems the reference or biasing voltage for keying the circuit elements on and off affects the output voltage to introduce inaccuracies in the result achieved. Furthermore, these keyed systems of the prior art using vacuum tubes as the rectifying elements introduce appreciable error because of the large unbalance output voltage. Among other disadvantages of some demodulators of the prior art is the limitation on the carrier frequency at which the demodulator may operate.

We have invented a transistor demodulator which is an improvement over demodulators of the prior art. Our demodulator is a keyed demodulator which overcomes many of the disadvantages of the prior art discussed hereinabove. Our demodulator is more accurate and has lower unbalance output voltage by several degrees of magnitude than demodulators of the prior art. Further, our demodulator permits the use of sinusoidal reference voltages. It may be used with good results over a wide range of carrier frequencies. Our demodulator is phase sensitive.

One object of our invention is to provide a keyed transistor demodulator which overcomes the disadvantages of keyed demodulators of the prior art.

Another object of our invention is to provide a transistor demodulator which is keyed without the use of external biasing potentials or self-biasing resistors and by-pass capacitors.

Still another object of our invention is to provide a keyed transistor demodulator which gives an accurate result over a wide range of carrier frequencies.

A still further object of our invention is to provide a keyed transistor demodulator which produces a highly linear voltage having little ripple.

Yet another object of our invention is to provide a keyed transistor demodulator which employs sinusoidal reference voltages.

A still further object of our invention is to provide a keyed transistor demodulator in which the output voltage is independent of the reference voltage level.

Still another object of our invention is to provide a keyed transistor demodulator which is phase sensitive.

Other and further objects of our invention will appear from the following description:

In general our invention contemplates the provision of a transistor demodulator for producing a direct current voltage proportional to the magnitude of an input carrier signal including a transistor circuit having no direct current biasing potentials but having a characteristic such that no emitter current flows unless the emitter to base potential is above a certain level. Our demodulator includes means for applying the input carrier signal across the base and collector circuit of the transistor. We apply a sinusoidal reference voltage to the transistor emitter to render the base circuit conductive for a predetermined period of time in the area of the maximum of the input signal. Our demodulator has a number of transistors arranged to provide full wave operation and to be phase sensitive. We connect a capacitor in the collector circuits of our transistors to produce a substantially linear output direct current voltage having little ripple. The magnitude of this voltage is proportional to the magnitude of the input carrier signal.

In the accompanying drawings which form part of the instant specification and which are to be read in conjunction therewith, and in which like reference numerals are used to indicate like parts in the various views.

Figure 1:
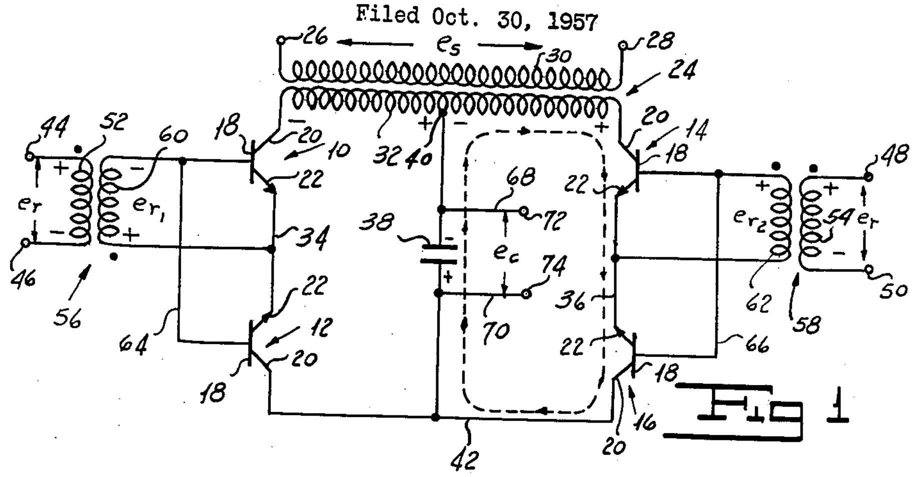
FIGURE 1 is a schematic view of one form of our transistor demodulator shown in one condition of its operation.

Referring now more particularly to the drawings, one form of our transistor demodulator includes a plurality of respective transistors indicated generally by the reference characters 10, 12, 14, and 16, each of which has a base 18, a collector 20, and emitter 22. In this form of our invention the transistors 10, 12, 14, and 16 of our demodulator are of any type in which emitter current will not flow until the emitter to base potential reaches a predetermined level of the proper polarity. For example, these transistors may be n-p-n silicon transistors having this characteristic. As is the case in the usual transistor operation, emitter current is used to control current in the collector circuit. In operation of our transistors, substantially no collector current flows until the emitter conducts. This conduction takes place when the emitter-to-base potential reaches a predetermined value of the proper polarity. We make use of this unique characteristic to key our demodulator in a manner to be described hereinafter.

Our demodulator includes a transformer indicated generally by the reference character 24 for applying a carrier signal $e_s$ to the transistor collectors. We apply the signal $e_s$ to the input terminals 26 and 28 of the primary winding 30 of our transformer 24. We connect the secondary winding 32 of transformer 24 between the respective collectors of transistors 10 and 14. Respective conductors 34 and 36 provide common connections between the emitters of transistors 10 and 12 and between the emitters of transistors 14 and 16. We connect a capacitor 38 between a center tap 40 on winding 32 and a common conductor 42 connecting the collectors of transistors 12 and 16. It will be seen that the connections described provide a means for applying the center tapped secondary voltages of transformer 24 to the collectors 20 of the respective transistors.

We apply a reference voltage $e_r$ which is synchronous with the source supplying the carrier signal $e_s$ to the pairs of input terminals 44 and 46 and 48 and 50 of respective primary windings 52 and 54 of a pair of transformers indicated generally by the reference characters 56 and 58 respectively. Transformers 56 and 58 have respective oppositely wound secondary windings 60 and 62 as is indicated by the polarity marks in FIGURE 1. With the voltage $e_r$ applied to primary windings 52 and 54 respective voltages $e_{r1}$ and $e_{r2}$ which are 180° out of phase are produced across the respective secondary windings 60 and 62.

We connect winding 60 between the base of transistor 10 and the common emitter conductor 34 of transistor 10 and 12. A conductor 64 connects the bases 18 of transistors 10 and 12. It will be seen that with these connections the same emitter-to-base potential is applied to both transistors 10 and 12.

We connect the secondary winding 62 of transformer 58 between the base of transistor 14 and the common emittere conductor 36 of transistors 14 and 16. A conductor 66 connects the bases 18 of transistors 14 and 16. With these connections the same emitter-to-base potential is applied to both transistors 14 and 16. This potential is 180° out of phase with the potential applied to the emitter-to-base circuits of transistors 10 and 12.

Figure 3:
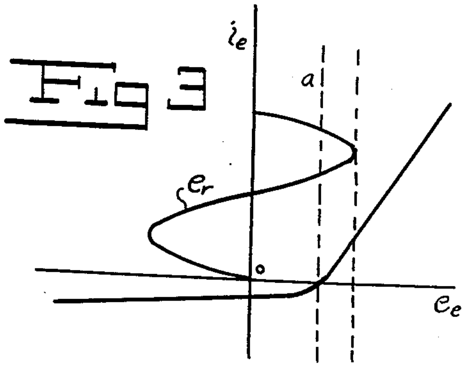
FIGURE 3 is a plot illustrating the diode characteristic of the transistor circuits used in our transistor demodulator.

Referring to FIGURE 3 we have illustrated the diode characteristic of our transistors diagrammatically. From the figure it can be seen that no current will flow, for example, in the emitter circuit, until the emitter-to-base potential reaches a certain value indicated by the broken line *a* in the figure. Current continues to flow until the potential again drops to the value represented by *a*. As is known in the art, in operation of transistor circuits collector current flows only when emitter current flows. As a result collector current in our transistors flows only during the period of time when the reference voltage $e_{r1}$ or $e_{r2}$ exceeds the predetermined value determined by the transistor characteristic. Once a transistor has been turned "on" the collector current is independent of the reference voltage level.

As is known in the art, in the case of an n-p-n transistor in its operation as a transistor no collector current flows unless the emitter is biased negatively with respect to the base. Referring to FIGURE 1 in one condition of operation of our demodulator the polarities of the various voltages are as shown. The emitters of both transistors 10 and 12 are biased positively with respect to the base with the result that no current flows in these transistors. This may be termed the "off" condition of these transistors. At the same time the polarity of the potential $e_{r2}$ is such that the emitters of transistors 14 and 16 are biased negatively with respect to the bases. Consequently, a current tends to flow in the emitter circuits. It will be remembered that with our transistors no emitter current flows until the emitter-to-base potential reaches a level determined by the transistor characteristic. We so select $e_r$ that $e_{r2}$ exceeds the level for which the emitter circuit conducts for only a short period of time in the region of the maximum of the voltage $e_s$. With the polarities as shown in FIGURE 1 during the period that $e_{r2}$ exceeds that voltage level for which emitter current flows, transistors 14 and 16 act much like closed switches, permitting current to flow as indicated by the broken lines in FIGURE 1. It will be seen that current flows into the condenser 38 in a direction to charge the lower plate, as viewed in the figure, positively.

Respective conductors 68 and 70 connect the capacitor 38 to output terminals 72 and 74. As soon as $e_{r2}$ drops below the level at which conduction is sustained in the emitter circuit current no longer flows in the collector circuit and transistors 14 and 16 are cut off. This keying operation prevents the capacitor voltage from being dragged down with the secondary voltage across winding 32 as this voltage returns to zero.

Figure 2:
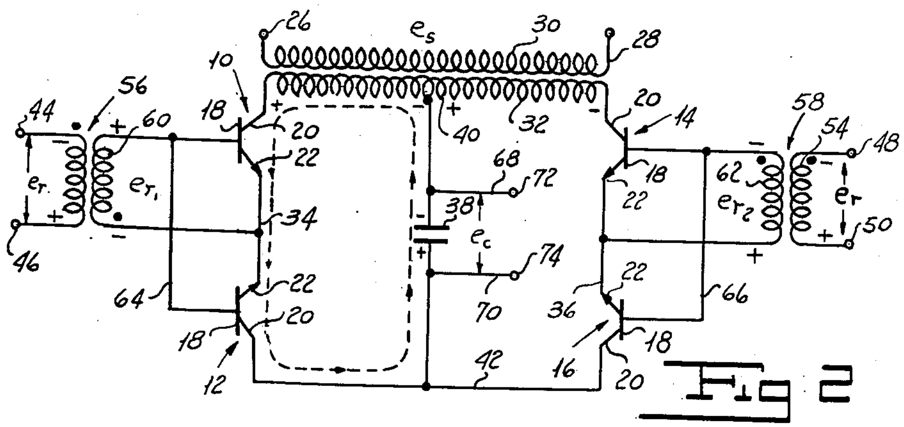
FIGURE 2 is a schematic view of the form of our transistor demodulator shown in FIGURE 1 in another condition of its operation.
Figure 4:
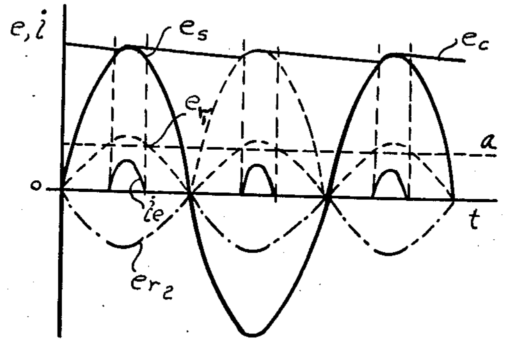
FIGURE 4 is a plot showing the relationship between various circuit potentials in our transistor demodulator.

When the polarity of $e_s$ reverses on the next half cycle transistors 14 and 16 remain cut off and transistors 10 and 12 are turned on so that current flows in the paths indicated by the broken lines in FIGURE 2. It will be seen that current flow into capacitor 38 in this condition of the circuit is in the same direction as in FIGURE 1 with the result that full wave operation is achieved. With none of the transistors 10, 12, 14, and 16 conducting, the capacitor discharge time constant is long. As a result the voltage across the capacitor is not substantially affected while the transistors do not conduct. This can be seen by reference to FIGURE 4 in which the various potentials in the circuit are shown with respect to the signal or carrier voltage $e_s$ and reference voltages $e_{r1}$ and $e_{r2}$. Current through the capacitor flows only for a short period of time during each carrier half cycle until the capacitor charges to the level of the carrier.

Figure 5:
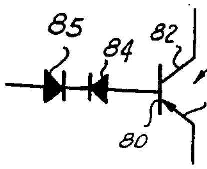
FIGURE 5 is a fragmentary schematic view showing alternative methods of obtaining keyed operation of our transistor demodulator.

Referring now to FIGURE 5, in an alternative form of our transistor demodulator, we replace each of the n-p-n transistors 10, 12, 14, and 16 of FIGURES 1 and 2 by a p-n-p transistor, indicated generally by the reference character 76, having an emitter 78 and a base 80 and a collector 82. For each of the pairs of substituted p-n-p transistors 76, the junction of the emitters 78 is connected forwardly through a diode 84 and then backwardly through a diode 85 to one terminal of each of the secondary windings of reference signal transformers 56 and 58 respectively. Transistor 76 may be a silicon transistor; and diode 84 may be a silicon crystal diode. The referend voltage $e_r$ is greatly increased so that crystal 85 is operated in the Zener region of its reverse characteristic. Transistors 76 will act as closed switches only during that period where the bases 80 are sufficiently negative with respect to the emitters 78 to cause emitter current to flow. The predetermined voltage level at which emitter current flows is then the sum of three voltages: firstly, the energy gap voltage of the silicon transistor 78; secondly, the energy gap voltage of the silicon crystal 84; and thirdly, the reverse Zener breakdown voltage of the diode 85. Any one of these three voltages is sufficient to permit proper keyed operation. There are therefore three basic alternative forms of our transistor demodulator to provide for proper keyed operation. Each of the alternative forms advantageous employs the characteristics of a p-n junction to provide the predetermined voltage level necessary for keyed operation. In a first form, the p-n junction is the base-emitter junction of an n-p-n silicon transistor, as shown in FIGURES 1 and 2, or the emitter-base junction of a p-n-p silicon transistor, as shown in FIGURE 5. In a second form, the p-n junction is that of a silicon diode so disposed that the emitter current of a transistor flows forwardly through the silicon diode, as shown in FIGURE 5. In the first and second forms of our transistor demodulator, then, the predetermined voltage level for keyed operation is determined by the energy gap voltage of a silicon p-n junction. In a third form, the p-n junction is that of a diode so disposed that the emitter current of a transistor flows backwardly through the diode, as shown in FIGURE 5. In the third form of our transistor demodulator, then, the predetermined voltage level for keyed operation is determined by the reverse Zener breakdown voltage of a p-n junction. As shown in FIGURE 5, any combination of these three basic alternative forms may be used.

Referring again to FIGURE 5, in a further alternative form of our transistor demodulator, we replace only the pair of p-n-p transistors 10 and 12 by n-p-n silicon transistors 76. Only one of reference transformers 56 and 58 is now required, and a reference voltage of the same polarity is applied between the emitters and bases of transistors 14 and 16 and each of transistors 76. As is well known in the art, the provision of both n-p-n and p-n-p transistors eliminates the need for phase splitting the reference voltage. It will be appreciated that the use of a common reference signal for all transistors will require similar alternative forms of obtaining proper keyed operation be used for both the n-p-n and the p-n-p transistors so that the predetermined voltage level at which emitter current flows is the same for all transistors.

In operation of the form of our transistor demodulator shown in FIGURES 1 and 2 we apply the reference signal $e_r$ to the terminals 44 and 46 and to terminals 48 and 50. With the polarities of the potentials as shown in FIGURE 1 transistors 14 and 16 are rendered conductive for a short period of time in the region of the maximum of the carrier signal. Capacitor 38 charges to the level of the carrier. The time constant for this charging operation is very short owing to the low resistance in the transistor circuit. Preferably this constant is shorter than the period of time during which the transistors conduct to ensure operation near the peak value of the carrier signal $e_s$. Between the time at which transistors 14 and 16 are cut off and the time transistors 10 and 12 become conductive the time constant of the capacitor discharge circuit is very long so that the voltage across the capacitor is not appreciably affected. When transistors 10 and 12 are rendered conductive as $e_{r1}$ exceeds the level determined by the transistor characteristic, current tends to flow in the same direction through the capacitor with the result that the capacitor again charges to the carrier level. With this operation the voltage across the capacitor is substantially linear. Its only appreciable variation results from changes in the magnitude of the carrier, which changes represent the intelligence in the carrier wave. When we employ the circuit shown in FIGURE 5 to replace the transistors 10, 12, 14, and 16, the operation of our demodulator is analogous to the operation of the form of demodulator shown in FIGURES 1 and 2.

It will be appreciated that we have produced a highly linear demodulated voltage with very little ripple.

Our transistor demodulator is phase sensitive. This will readily be apparent if we consider the polarity of $e_s$ shown in FIGURES 1 and 2 to be reversed from that shown with the same reference phase. In this case current tends to flow into the top capacitor plate as viewed in the drawings to produce a capacitor potential $e_c$ of opposite polarity to that indicated in the drawings.

It will be seen that we have accomplished the objects of our invention. We have provided a transistor demodulator which is an improvement over demodulators of the prior art. We achieve keyed operation of the demodulator without the necessity of employing auxililary biasing potentials in the circuit. Our demodulator produces an essentially linear direct current output signal with little ripple. Our demodulator produces an output voltage which is substantially independent of reference voltage level. It is phase sensitive and may be employed over a wide range of frequencies up to a high frequency of the order of hundreds of kilocycles. Our transistor has very little drift and provides excellent quadrature rejection.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. A keyed transistor demodulator including in combination a source of carrier input signal having a peak amplitude, a transistor having a base and an emitter and a collector, the base and emitter composing a first p-n junction, a second p-n junction, one of the p-n junctions having the characteristic of presenting a high impedance to voltages of a certain polarity and of a magnitude greater than zero and less than a predetermined magnitude and a low impedance to voltages of said certain polarity and of a magnitude greater than such magnitude, a reference circuit including the two junctions, a source of reference voltage synchronous with the carrier signal and of a peak amplitude slightly greater than such predetermined magnitude, means connecting the source of reference voltage to the reference circuit to render the junction having said characteristic conductive only in the region of the peak amplitude of said carrier signal, and means including a capacitor connecting the source of carrier input signal to the collector.

2. A keyed transistor demodulator as in claim 1 in which the reference circuit includes means serially connecting the junctions in such manner that forward current through the first junction flows forwardly through the second junction, and in which one of the two p-n junctions is a silicon junction.

3. A keyed transistor demodulator as in claim 1 in which the reference circuit includes a third p-n junction and means serially connecting the three junctions in such manner that forward current through the first junction flows backwardly through the second junction and forwardly through the third junction.

4. A keyed transistor demodulator including in combination a source of carrier input signal having a peak amplitude, a transistor having a base and an emitter and a collector, the base and emitter composing a p-n junction having the characteristic of presenting a high impedance to voltages of a certain polarity and of a magnitude greater than zero and less than a predetermined magnitude and a low impedance to voltages of said certain polarity and of a magnitude greater than such magnitude, a reference circuit including the junction, a source of reference voltage synchronous with the carrier signal and of a peak amplitude slightly greater than such predetermined magnitude, means connecting the source of reference voltage to the reference circuit to render the junction having said characteristic conductive only in the region of the peak amplitude of said carrier signal, and means including a capacitor connecting the source of carrier input signal to the collector.

5. A keyed transistor demodulator including in combination a source of carrier input signal having a peak amplitude, a pair of transistors each having a base and an emitter and a collector, the bases and emitters composing a pair of p-n junctions, a third p-n junction, one of the p-n junctions having the characteristic of presenting a high impedance to voltages of a certain polarity and of a magnitude greater than zero and less than a predetermined magnitude and a low impedance to voltages of said certain polarity and of a magnitude greater than such magnitude, a reference circuit including the three junctions, a source of reference voltage synchronous with the carrier signal and of a peak amplitude slightly greater than such predetermined magnitude, means connecting the source of reference voltage to the reference circuit to render the junction having said characteristic conductive only in the region of the peak amplitude of said carrier signal, and means including a capacitor connecting the source of carrier input signal to the collectors.

6. A keyed transistor demodulator including in combination a source of carrier input signal having a peak amplitude, a first and a second and a third and a fourth transistor each having a base and an emitter and a collector, the emitters and bases composing a first and a second and a third and a fourth p-n junction, a fifth p-n junction, a sixth p-n junction, two of the p-n junctions having the characteristic of presenting a high impedance to voltages of a certain polarity and of a magnitude greater than zero and less than a predetermined magnitude and a low impedance to voltages of said certain polarity and of a magnitude greater than such magnitude, a reference circuit including the six junctions, a source of reference voltage synchronous with the carrier signal and of a peak amplitude slightly greater than such predetermined magnitude, means connecting the source of reference voltage to the reference circuit to render the junction having said characteristic conductive only in the region of the peak amplitude of said carrier signal, means for phase splitting the carrier input signal, means including a capacitor connecting one phase of the carrier input signal to the collectors of the first and second transistors, and means including the capacitor connecting the other phase of the carrier input signal to the collectors of the third and fourth transistors.

7. A keyed transistor demodulator including in combination a source of carrier input signal having a peak amplitude, a first and a second and a third and a fourth transistor each having a base and an emitter and a collector, the bases and emitters composing a first and a second and a third and a fourth p-n junction, a fifth p-n junction, a sixth p-n junction, a first reference circuit including the first and second and fifth junctions, a second reference circuit including the second and fourth and sixth junctions, one of the p-n junctions of each of the reference circuits having the characteristic of presenting a high impedance to voltages of a certain polarity and of a magnitude greater than zero and less than a predetermined magnitude and a low impedance to voltages of said certain polarity and a magnitude greater than such magnitude, a source of reference voltage synchronous with the carrier signal and of a peak amplitude slightly greater than such predetermined magnitude, means connecting the source of reference voltage to the two reference circuits to render the junctions having said characteristic conductive only in the region of the peak amplitude of said carrier input signal, means phase splitting the carrier input signal, means including a capacitor connecting one phase of the carrier input signal to the collectors of the first and second transistors, and means including the capacitor connecting the other phase of the carrier input signal to the collectors of the third and fourth transistors.

8. A keyed transistor demodulator including in combination a source of carrier input signal having a peak amplitude, a first and second and a third and a fourth transistor each having a base and an emitter and a collector, the bases and emitters composing a first and a second and a third and a fourth p-n junction, a fifth p-n junction, a sixth p-n junction, a first reference circuit including the first and second and fifth junctions, one of the p-n junctions of the first reference circuit having the characteristic of presenting a high impedance to voltages of a certain polarity and of a magnitude greater than zero and less than a first predetermined magnitude and a low impedance to voltages of said certain polarity and of a magnitude greater than such first magnitude, a second reference circuit including the third and fourth and sixth junctions, one of the p-n junctions of the second reference circuit having the characteristic of presenting a high impedance to voltages of a certain polarity and of a magnitude greater than zero and less than a second predetermined magnitude and a low impedance to voltages of said certain polarity and of a magnitude greater than such second magnitude, a source of reference voltage synchronous with the carrier signal, means splitting the reference voltage into two phases, the first phase having a peak amplitude slightly greater than such first predetermined magnitude and the second phase having a peak amplitude slightly greater than such second predetermined magnitude, means connecting the first phase of reference voltage to the first reference circuit to render said one junction of said first reference circuit conductive only in the region of the peak amplitude of said carrier input signal, means connecting the second phase of the reference voltage to the second reference circuit to render said one junction of said second reference circuit conductive only in the region of the peak amplitude of said carrier signal, means for phase splitting the carrier input signal, means including a capacitor connecting one phase of the carrier input signal to the collectors of the first and second transistors, and means including the capacitor connecting the other phase of the carrier input signal to the collectors of the third and fourth transistors.

9. A keyed transistor demodulator including in combination a source of carrier input signal having a peak amplitude, a first and a second and a third and a fourth transistor each having a base and an emitter and a collector, the bases and emitters composing a first and a second and a third and a fourth p-n junction each having the characteristic of presenting a high impedance to voltages of a certain polarity and of a magnitude greater than than zero and less than a predetermined magnitude and a low impedance to voltages of said certain polarity and of a magnitude of greater than such magnitude, a first reference circuit including the first and second junctions, a second reference circuit including the third and fourth junctions, a source of reference voltage synchronous with the carrier signal, means splitting the reference voltage into two phases each having a peak amplitude slightly greater than such predetermined magnitude, means connecting one phase of the reference voltage to the first reference circuit to render said first and second junctions conductive only in the region of the peak amplitude of said carrier signal, means connecting the other phase of the reference voltage to the second reference circuit to render said third and fourth junctions conductive only in the region of the peak amplitude of said carrier signal, means phase splitting the carrier input signal, means including a capacitor connecting one phase of the carrier input signal to the collectors of the first and second transistors, and means including the capacitor connecting the other phase of the carrier input signal to the collectors of the third and fourth transistors.

10. A keyed demodulator including in combination a source of carrier input signal having a peak amplitude, a p-n junction composed of semiconducting materials and having the characteristic of presenting a high impedance to voltages of a certain polarity and of a magnitude greater than zero and less than a predetermined magnitude and a low impedance to voltages of said certain polarity and of a magnitude greater than such magnitude, a reference circuit including the junction, a source of reference voltage synchronous with the carrier signal and of a peak amplitude slightly greater than such predetermined magnitude, means connecting the source of reference voltage to the reference circuit to render the junction having said characteristic conductive only in the region of the peak amplitude of said carrier signal, an element composed of a semi-conducting material, and means rendering current through the semi-conducting element responsive to current in the reference circuit.

References Cited in the file of this patent

UNITED STATES PATENTS

| | | |
|---|---|---|
| 2,509,337 | Earp | May 30, 1950 |
| 2,780,725 | Johanson | Feb. 5, 1957 |
| 2,810,024 | Stanley | Oct. 15, 1957 |
| 2,820,143 | D'Nelly et al. | Jan. 14, 1958 |
| 2,878,384 | Holmes | Mar. 17, 1959 |
| 2,937,342 | Wellman | May 17, 1960 |

FOREIGN PATENTS

| | | |
|---|---|---|
| 779,217 | Great Britain | July 17, 1957 |

OTHER REFERENCES

Hunter: "Handbook of Semiconductor Electronics" published October 15, 1956, McGraw-Hill Book Co., New York, pages 16–23 to 16–27.